A. H. COOPER.
COLLAPSIBLE MILK BOTTLE.
APPLICATION FILED MAR. 7, 1919.

1,317,687.

Patented Oct. 7, 1919.

Inventor,
A. H. Cooper
By Cashow & Co.
Attorneys.

Witness

UNITED STATES PATENT OFFICE.

ALVA H. COOPER, OF AUGUSTA, GEORGIA.

COLLAPSIBLE MILK-BOTTLE.

1,317,687.  Specification of Letters Patent.  Patented Oct. 7, 1919.

Application filed March 7, 1919. Serial No. 281,157.

*To all whom it may concern:*

Be it known that I, ALVA H. COOPER, a citizen of the United States, residing at Augusta, in the county of Richmond and State of Georgia, have invented a new and useful Collapsible Milk-Bottle, of which the following is a specification.

It is the object of this invention to provide a milk bottle which, being made out of paraffin paper, or like material, may be collapsed readily, so as to occupy but little space when not in use, novel means being provided for closing the mouth of the bottle and novel means being provided for maintaining a pouring spout, when the bottle has been opened.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown, can be made without departing from the spirit of the invention.

In the accompanying drawings:—

Figure 1:
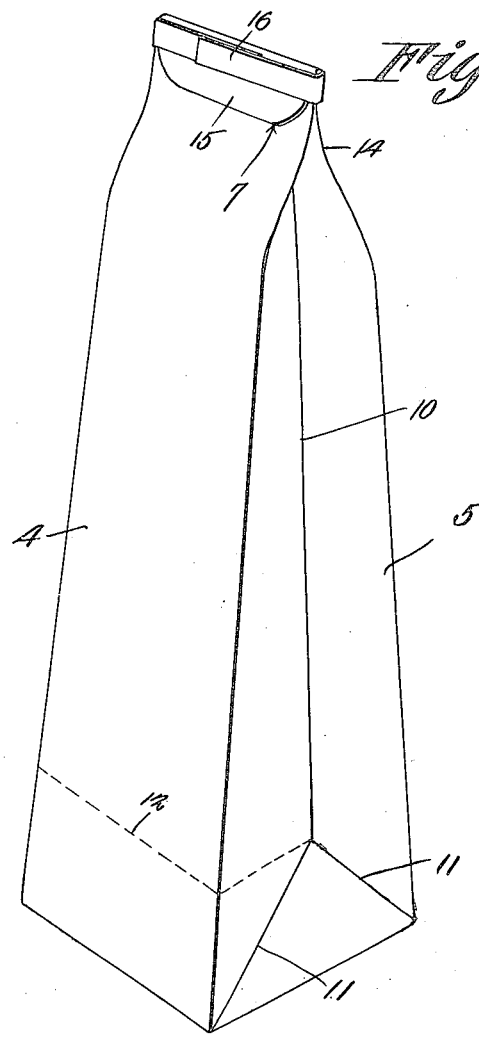
Figure 2:
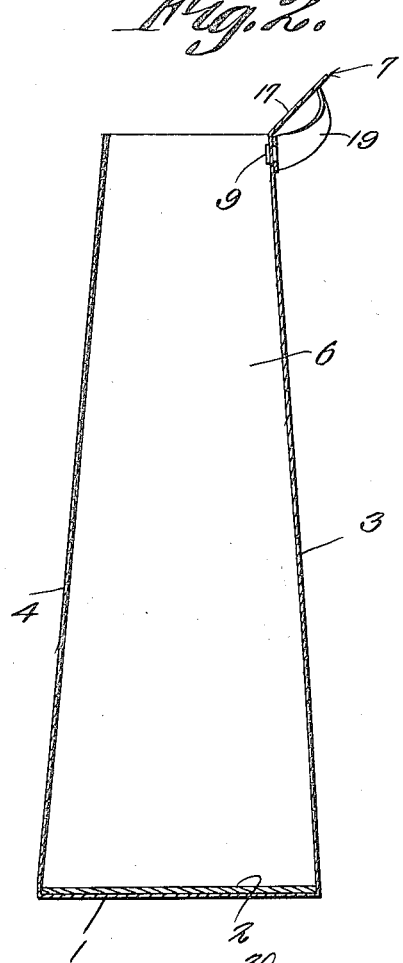
Figure 3:
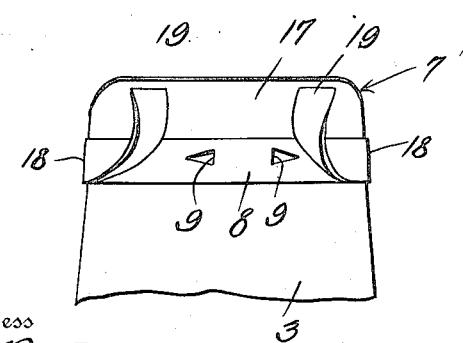

Figure 1 shows in perspective, a milk bottle constructed in accordance with the invention, in the position which it will occupy when filled; Fig. 2 is a longitudinal section; Fig. 3 is a fragmental elevation; and Fig. 4 is a fragmental perspective showing the bottle in partially collapsed condition.

The bottle forming the subject matter of this application preferably is made of paraffin paper, throughout, although some other substance may be used, if desired, the bottle including a bottom 1 which may be reinforced or stiffened as shown at 2. The bottle includes oppositely disposed walls 3 and 4, and oppositely disposed walls 5 and 6, the walls 3 and 4 being disposed at right angles to walls 5 and 6. At its upper end, the wall 3 is provided with a flap 7. A retainer 8, preferably in the form of a bendable strip of metal is secured, intermediate its ends, by prongs 9 or otherwise, to the wall 3, near the base or lower edge of the flap 7. The walls 5 and 6 are supplied with longitudinal creases 10, and with diverging creases 11 which extend toward the corners of the bottom 1. The wall 4 may be creased transversely, near to its lower end, as shown at 12. Owing to the fact that the walls 4 and 5 are creased longitudinally as indicated at 10, the said walls may be brought together, at their upper ends, as indicated at 14 in Fig. 1, the flap 7 overhanging the wall 4, as shown at 15, and being held in place by the ends 16 of the retaining strip 8. Assuming that the bottle is filled, it will be clear that the bottle will be sealed so as to retain the liquid which it may contain.

When it is desired to use the contents of the bottle, the ends 16 of the retainer 8 are bent backwardly, as shown at 18, and are bent upwardly, as shown at 19. This operation sets the flap 7 free, the flap being upwardly inclined, to form a pouring spout, as shown at 17, and being supported on the upwardly extended ends of the retainer 8—all of which will be understood clearly when Figs. 2 and 3 are examined.

Figure 4:
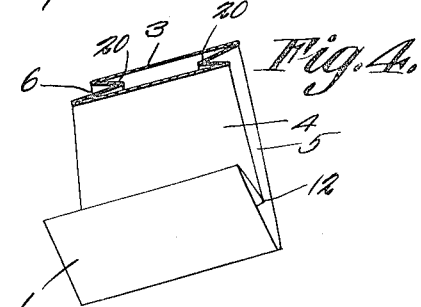

When it is desired to collapse the bottle, the walls 4 and 3 may be brought together, as indicated in Fig. 4, the walls 5 and 6 folding inwardly, as indicated at 20, owing to the presence of the creases 10 and 11. The wall 4 may be folded along the crease 12, thus to dispose the bottom 1 approximately parallel to the wall 4, as indicated in Fig. 4. The flap 7 is held in the position indicated at 15, in Fig. 1, and thus the bottle, although collapsed, is sealed, so that the interior of the bottle cannot be contaminated.

Since the bottle is made of paraffin paper or like material, the bottle can be manufactured at trifling expense, and need be used but once.

Having thus described the invention, what is claimed is:—

A collapsible container comprising walls, one of which is provided with an outstanding pouring spout, the spout being foldable to overlap the other wall thereby to form a closure; and a strip secured intermediate its ends and independently of the spout to the wall which is provided with the spout, the ends of the strip extending beneath the spout to support the same, and being foldable to overlap the spout, when the spout is in closure-forming position, thereby to retain the spout in closure-forming position.

In testimony that I claim the foregoing as my own, I have hereto affixed my signature in the presence of two witnesses.

ALVA H. COOPER.

Witnesses:
J. C. BRIDGER,
V. M. COOPER.